United States Patent
Roser

[19]

[11] Patent Number: 6,147,420
[45] Date of Patent: Nov. 14, 2000

[54] WIRELESS SWITCHING SYSTEM

[75] Inventor: Herman Roser, Biebertal, Germany

[73] Assignee: Lear Automotive Dearborn, Inc., Southfield, Mich.

[21] Appl. No.: 09/125,369

[22] PCT Filed: Dec. 16, 1997

[86] PCT No.: PCT/US97/22673

§ 371 Date: Aug. 17, 1998

§ 102(e) Date: Aug. 17, 1998

[87] PCT Pub. No.: WO98/27522

PCT Pub. Date: Jun. 25, 1998

[51] Int. Cl.$^7$ .................................................. H01H 35/00
[52] U.S. Cl. ...................... 307/117; 307/10.1; 340/657; 340/658
[58] Field of Search .................... 307/10.1, 117, 307/125, 10.2, 10.5; 340/539, 572, 552, 562, 660, 658, 657; 342/44

[56] References Cited

U.S. PATENT DOCUMENTS

| | | | |
|---|---|---|---|
| 3,299,424 | 1/1967 | Vinding | 343/6.5 |
| 3,609,741 | 9/1971 | Miller | 340/539 |
| 3,696,379 | 10/1972 | Minasy | 340/572 |
| 4,196,418 | 4/1980 | Kip et al. | 340/152 |
| 4,523,178 | 6/1985 | Fulhorst | 340/64 |
| 4,551,654 | 11/1985 | Barnum | 315/159 |
| 4,893,118 | 1/1990 | Lewiner et al. | 340/825.54 |
| 4,973,912 | 11/1990 | Kaminski et al. | 324/652 |
| 5,053,774 | 10/1991 | Schuermann et al. | 342/44 |
| 5,457,461 | 10/1995 | Schuermann | 342/44 |
| 5,497,311 | 3/1996 | Hanawaka | 363/21 |
| 5,552,789 | 9/1996 | Schuermann | 342/42 |
| 5,606,314 | 2/1997 | Mitushashi et al. | 340/825.69 |
| 5,616,966 | 4/1997 | Fischer et al. | 307/10.5 |

FOREIGN PATENT DOCUMENTS

| | | |
|---|---|---|
| 0380314 | 1/1990 | European Pat. Off. . |
| 3915188 | 11/1990 | Germany . |

*Primary Examiner*—Albert W. Paladini
*Attorney, Agent, or Firm*—Brooks & Kushman P.C.

[57] ABSTRACT

A wireless switching system includes a central transmitter unit which generates a plurality of electromagnetic frequencies. A plurality of switches within the electromagnetic field each selectively open and close a resonant circuit having a unique resonant frequency. When the user activated switch closes its associated resonant circuit, the resonant circuit consumes energy from the electromagnetic field at its resonant frequency. The central transmitter unit detects this energy consumption and the frequency at which the energy consumption occured and consequently activates a vehicle function associated with the closed user activated switch.

10 Claims, 1 Drawing Sheet

WIRELESS SWITCHING SYSTEM

BACKGROUND OF THE INVENTION

The present invention relates generally to a system for providing remote wireless switches.

Current vehicles are including an increasing number of electrical features which require user-activated switches. These switches are mounted in various locations inside the vehicle, including in the doors and on the steering wheel. The wiring required by these numerous switches increases the time for assembly and the cost of the vehicle. Each connection between wires provides a potential failure point in the system. In addition, the wiring for these numerous switches increases the total weight of the vehicle.

RF transmitters, such as are used for remote entry systems can be used as a wireless switch; however, the RF transmitter requires a power supply, such as a battery, which must be replaced periodically.

SUMMARY OF THE INVENTION

The present invention provides a wireless switching system. The wireless switching system includes a central transmitter unit which generates a plurality of electromagnetic frequencies. A plurality of user-activated switches each selectively open and close a resonant circuit within the electromagnetic field generated by the central transmitter unit. Each of the resonant circuits has a unique resonant frequency which is included in the plurality of frequencies generated by the central transmitter unit.

The central transmitter unit continuously generates the electromagnetic field. When one of the switches is closed, the associated resonant circuit consumes energy at its resonant frequency from the electromagnetic field generated by the central transmitter unit. The central transmitter unit continuously monitors its energy consumption and the frequencies at which energy is consumed. When the central transmitter unit detects energy consumption at one of the resonant frequencies, it activates the vehicle function associated with the switch that closed the resonant circuit.

The wireless switching can also be used as a passive anti-theft device. The driver carries a card having a resonant circuit having a resonant frequency. When the driver carrying the card approaches or enters the car, the central transmitter unit detects the presence of the resonant circuit and releases the use of the car.

A plurality of resonant circuits can be multiplexed in order to accommodate a higher number of vehicle functions. For example, each of a plurality of user switches in a door of a vehicle could be assigned to a unique combination of two or three of the resonant circuits.

The resonant circuit is inexpensive and simple and can be made by metal stamping, printing or by vacuum evaporation and can be contained inside the switches. The wireless switching system eliminates the need to wire each switch to a controller. Reduction of wiring in a vehicle decreases the vehicle assembly time, cost and weight. Further, the resonant circuits require no power supply to be recharged or replaced periodically.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
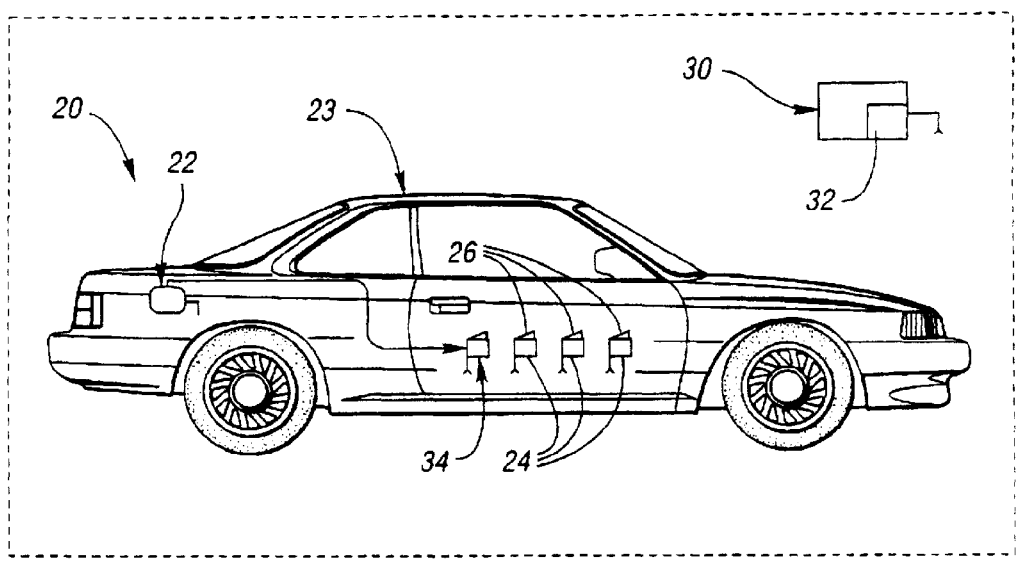
FIG. 1 is a schematic of the present invention as installed in a vehicle.

The present invention provides a wireless switching system 20 generally comprising a central transmitter unit 22 generating an electromagnetic field having a plurality of frequencies in a vehicle 23. A plurality of resonant circuits 24 are selectively opened and closed by user-activated switches 26. When its associated switch 26 is closed, each resonant circuit 24 has a unique resonant frequency which is included in the plurality of frequencies generated by the central transmitter unit 22. The resonant circuits 24 and switches 26 are located throughout the interior of the vehicle 23, such as in the doors or on the steering wheel. Further, the driver of the vehicle 23 carries a driver identification card 30 which includes a closed resonant circuit 32 having a unique resonant frequency. The driver identification card 30 need not include a user-activated switch.

The central transmitter unit 22 continuously monitors its power consumption and the frequencies at which the power is consumed. Preferably, the central transmitter unit 22 generates a single electromagnetic signal which includes all of the resonant frequencies of the resonant circuits 24, and by using Fourier analysis determines the frequencies at which power is consumed. Alternatively, the central transmitter unit 22 comprises a plurality of frequency generating circuits which each generate an electromagnetic field at one of the resonant frequencies of the resonant circuits 24. Given this detailed description of the present invention, the details of the central transmitter unit 22 are within the skill of one skilled in the art of electromagnetic field generators and circuits for monitoring power consumption.

In operation, the central transmitter unit 22 generates the resonant frequencies of the resonant circuits 24 and 32. If all of these switches 26 are open and the driver identification card 30 is not within the electromagnetic field generated by the central transmitter unit 22, the central transmitter unit 22 determines that no power (or insufficient power) has been consumed at any of the resonant frequencies. Upon activation of a switch 26, the associated resonant circuit 24 is closed and begins to consume power at its resonant frequency. The central transmitter unit 22 detects that energy is being consumed at the resonant frequency and activates a vehicle function circuit 34 associated with the user activated switch 26. Similarly, while the central transmitter unit 22 determines that the driver identification card 30 is not present within the electromagnetic field, the central transmitter unit 22 prevents the release of the vehicle 23, such as by locking the doors or otherwise disabling the vehicle 23. When the driver approaches the vehicle 23 carrying the proper driver identification card 30, the resonant circuit 32 absorbs energy at its resonant frequency. This energy consumption is detected by the central transmitter unit 22, which then releases the use of the vehicle 23.

Figure 2:
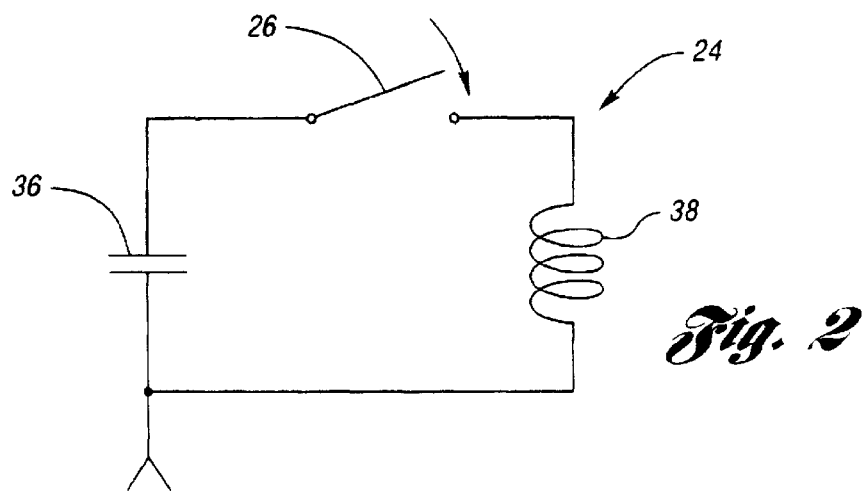
FIG. 2 is a schematic of one possible resonant circuit that can be used in the wireless switching system of FIG. 1.

FIG. 2 is a schematic of a resonant circuit 24 which could be used in the wireless switching system 20 of FIG. 1. The associated user-activated switch 26 selectively opens and closes the resonant circuit 24 which comprises a capacitor 36 and an inductor 38. Some part of the resonant circuit 24 acts as an antenna at the resonant frequency to receive the energy from the electromagnetic field. The shape, size, manufacture and implementation of the antenna into the present invention are well within the skill of the art.

Figure 3:
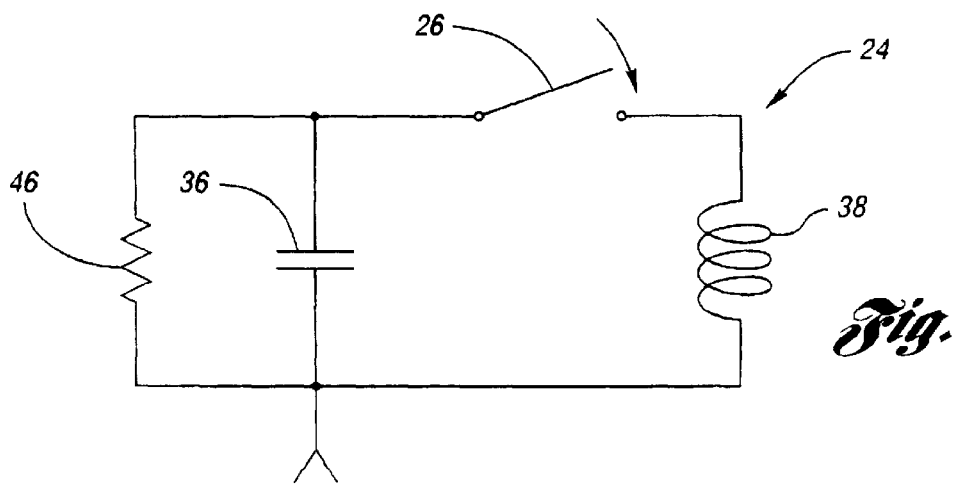
FIG. 3 is a schematic of an alternate resonant circuit which can be used in the wireless switching system of FIG. 1.

FIG. 3 is a schematic of an alternate resonant circuit 44 which could be used in the wireless switching system 20 of FIG. 1. The alternate resonant circuit 44 includes the user activated switch 26 which selectively opens and closes a circuit comprising a capacitor, an inductor, and a resistor 46. Addition of the resistor 46 to the resonant circuit 44 increases the time over which the energy at the resonant frequency is consumed, thereby making possible push-push functions in an extended time frame.

The wireless switching system 20 has been described as installed in a vehicle 23 only for purpose of illustration. It should be recognized that the wireless switching system 20 has many other applications, including switches in elevator cabins. Further, the user activated switches 26, each having an associated vehicle function, could each activate a combination of resonant circuits 24 of different resonant frequencies, such that energy loss at this combination of frequencies is required in order to activate the vehicle function. Further, for a plurality of user activated switches 26 mounted generally in a single location, a plurality of resonant circuits 24 each having a unique resonant frequency could be multiplexed, i.e. each user activated switch 26 would close a different combination of the plurality of resonant circuits 24, thereby reducing the number of resonant circuits 24 required for a given number of vehicle functions.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A switching system comprising:
   a resonant circuit having a resonant frequency;
   a central unit generating a field including said resonant frequency, said resonant circuit absorbing energy at said resonant frequency, wherein said central unit is arranged to measure energy loss at said resonant frequency to determine the presence of said resonant circuit in said field;
   a switch connected to the resonant circuit; and
   a function circuit activated by said central unit upon determination that said resonant circuit is in said field, wherein the resonant circuit is responsive to the switch to selectively control when the resonant circuit absorbs energy at the resonant frequency.

2. The switching system of claim 1 wherein said resonant circuit includes a resistor.

3. The switching system of claim 1 wherein the resonant circuit includes a capacitor and an inductor, the switch connects the capacitor and the inductor when said switch is switched.

4. The switching system of claim 1 further including a plurality of said resonant circuits each having a unique resonant frequency, said central unit activating a different function circuit upon detecting energy loss at each resonant frequency.

5. The switching system of claim 1 further including:
   a plurality of said resonant circuits, each having a unique frequency generated by said central unit;
   a plurality of switches, each said switch closing a unique combination of said plurality of said resonant circuits; and
   said central unit activating a unique function upon detecting energy loss at one of said unique combinations of said plurality of resonant frequencies.

6. The switching system of claim 1 wherein said central unit is installed in a vehicle.

7. The system of claim 1 further comprising a portable resonant circuit having a resonant frequency, wherein the portable resonant circuit is arranged to selectively absorb energy at the resonant frequency upon movement of the resonant circuit into the field.

8. A vehicle comprising:
   a resonant circuit having a resonant frequency, said resonant circuit associated with said vehicle function;
   a central unit generating a field in said vehicle, said field including said resonant frequency, said resonant circuit absorbing energy at said resonant frequency;
   said central unit measuring energy loss at said resonant frequency to determine the presence of said resonant circuit in said field; and
   a function circuit operating a vehicle function, said function circuit activated by said central unit upon determination that said resonant circuit is in said field.

9. The vehicle of claim 8 further including:
   a user-activated switch associated with said vehicle function, said switch selectively closing said resonant circuit, said resonant circuit absorbing energy from said field when closed.

10. A method for selectively activating a function including the steps of:
    generating a field including a first frequency;
    installing a resonant circuit in said field, said circuit having a resonant frequency equal to said first frequency when said resonant circuit is closed;
    associating said resonant circuit with a function circuit;
    selectively closing said resonant circuit to cause an energy loss at said first frequency;
    detecting said energy loss at said first frequency;
    and activating the associated function circuit upon detecting said energy loss.

* * * * *